Sept. 10, 1968      G. L. NELSON      3,400,820

SCREENING APPARATUS WITH ROTARY PULSING MEMBER

Filed March 30, 1965      6 Sheets-Sheet 1

Sept. 10, 1968   G. L. NELSON   3,400,820
SCREENING APPARATUS WITH ROTARY PULSING MEMBER
Filed March 30, 1965   6 Sheets-Sheet 2

Sept. 10, 1968  G. L. NELSON  3,400,820
SCREENING APPARATUS WITH ROTARY PULSING MEMBER
Filed March 30, 1965  6 Sheets-Sheet 3

Sept. 10, 1968  G. L. NELSON  3,400,820
SCREENING APPARATUS WITH ROTARY PULSING MEMBER
Filed March 30, 1965  6 Sheets-Sheet 5

United States Patent Office 3,400,820
Patented Sept. 10, 1968

3,400,820
SCREENING APPARATUS WITH ROTARY
PULSING MEMBER
George L. Nelson, Westwood, Mass., assignor to Bird
Machine Company, South Walpole, Mass., a corporation of Massachusetts
Filed Mar. 30, 1965, Ser. No. 443,957
21 Claims. (Cl. 209—273)

ABSTRACT OF THE DISCLOSURE

A screening apparatus for fibrous material and liquid mixture including a substantially cylindrical apertured screen member and a rotary pulsing member in the general form of a drum coaxially mounted within the screen defining therewith a screening zone, in which the peripheral fluid contacting surface of the rotary member is defined by a plurality of undulating band portions that are displaced from one another.

This invention relates to screening apparatus and has particular application to the screening of fibrous pulps for the paper industry.

A principal object of the invention is to provide a screening apparatus having high capacity, relative to its size. Another object of the invention is to provide a screening apparatus that has low power requirements relative to its capacity.

Other objects of the invention are to provide an improved screening apparatus from the points of view of ability to operate with high consistency pulps, ability to operate under high pressure conditions, and ability to perform its function with a low pressure drop. Other objects are to provide a screening apparatus that is compact, simple in design and easy to manufacture and maintain.

Another object of the invention is to provide a basic concept of a rotary member for a screening apparatus which can be relatively cavitation-free, durable and quiet in operation, which yet is capable of high speed operation and which in various specific forms, and with various relations to the other machine components can achieve various desired operating characteristics.

One specific object of the invention is to provide a high capacity, low power screening apparatus that offers a balance between screening efficiency and capacity that is suitable for the screening of waste paper pulps and pulps in which long fibers are acceptable.

The means for realizing these and other objects will be explained in the following description.

According to one aspect of the invention there is provided in association with an apertured screen member, a rotary member having a specially formed fluid-contacting surface that is directed toward but spaced from the screen member. In the first instance this surface is characterized by a gradual change in clearance relative to the screen member, gradually increasing and gradually decreasing in the direction of movement of the rotary member.

Preferably the screen member is in the form of a surface of revolution, with the rotary member located within the screen member and adapted for completely submerged, pressurized operation. In such a construction the peripheral surface of the rotary member, in its direction of movement, is advantageously formed of eccentric portions or lobes, and for this reason this aspect of the invention has been termed the "lobed rotor" aspect.

The slope of the fluid contacting surface of the rotary member is gradual in the increasing as well as decreasing clearance regions, and in general can be characterized as being sloped at angles of less than 15° relative to the direction of movement, and preferably substantially less in many instances. These sloped portions are quite long each comprising a substantial arc of the full circle of movement, at least 20° and preferably substantially more in many instances.

Advantageously at least a major portion of the surface of the rotary member is sloped in the direction of movement, sloping alternately toward and away from the screen member. Preferably, at least in predetermined regions, the surface is entirely undulating. Also, preferably, in undulating regions, the surface is continuous in the direction of movement, and free of substantial breaks and protuberances.

According to the invention, it has been found, however, that the lobed rotor concept offers an improved way of achieving a special fluid displacing profile of the type that has been previously proposed in the United States patent application entitled "Screening Apparatus" by Ian J. Clarke-Pounder, Ser. No. 363,438, to which reference is made. According to the present invention transversely adjacent lobed bands can be displaced relative to one another in the direction of movement to provide breaks or discontinuities in the surface in the direction transverse to the direction of movement and parallel to the screen member. These discontinuities can provide spaces that receive fluid displaced by the decreasing clearance regions of the rotary surface, while the overall surface of the rotary member nevertheless remains streamlined without sudden changes in the drag area, i.e. the area perpendicular to the direction of movement.

Advantageously, a rotary member can be made up of a plurality of separate segments joined together and forming a selected undulating pattern, depending upon the operating characteristics desired, and these segments are preferably wholly separate members, though they can be separately machined segments of a single member.

In the case of a rotary member for use with a screen member that is in the general form of a surface of revolution, the rotary member is preferably made up of a series of discs or layers of a selected thickness, and which provide a lobed profile. Thus, this aspect of the invention has been termed the multi-lobed rotor, or the multi-layered lobed rotor.

The rotary members of the invention can be provided with various features that take advantage of their basic construction. Thus, with regard to introduction of fluid to the screening zone, which in some instances is desired, the rotary member can be made hollow or can be provided with internal passages, and the outlets to the screening region can be provided in side walls of the rotor segments, in a manner preventing the fluid from being directed toward the screen member. Similarly, the layers of a multi-layered rotor can have their side walls set at a slight angle transversely to the direction of movement, or be otherwise arranged for the purpose of urging the fluid transversely, e.g. for feeding or fluid-conditioning purposes.

Another aspect of the screening apparatus of the invention is its possible incorporation of high speed rotary drive equipment. Driven at surface speeds on the order of 3000 f.p.m., the rotary member of the invention provides a means of maintaining a high rate of flow through the screen member with low power requirements, as well as low pressure drop across the screening apparatus. It should be understood, however, that the function of such a rotary member is not that of a pump, in the sense that all the fluid is to be driven through the screen member. Indeed, were such a result to be obtained, the apparatus would be useless in a screening apparatus. Rather, according to the invention, it has been found that with a spacing between the rotary member and screen member, even in the region of minimum clearance, and with the gradually sloped rotor, satisfactory screening efficiencies can be obtained with pulps having substantial commercial importance, for instance waste paper pulps and kraft pulps.

Where finer screening operation is required, there are provisions that can be made, for instance increase of minimum clearance between the rotary member and the screen member, and suitable adaptations of the multi-layer concept, for instance reduced layer thickness and decreased slope. In other instances it will be advantageous to combine the features of this invention with other features to obtain a composite screen, which for a selected application can have better characteristics than any one feature alone could provide.

For example various provisions can be employed as taught in the Clarke-Pounder application mentioned above. Thus the sloping portions or lobes could be provided with drill hole dents, or bumps. Or, referring to FIG. 1 of both the present application and Serial No. 363,438, the top half of the rotary member, in the region of greatest clearance, could be provided with gradually sloped lobes according to the present invention while the lower half could be as shown in the Clarke-Pounder application, FIG. 1.

In the present most preferred form of the apparatus the screen member takes the general form of a surface of revolution, either cylindrical or with slight taper, and the rotary member is disposed within the screen member, defining therebetween an annular screening zone. Advantageously, for pressurized operation, all the fluid conduits into and out of the screening apparatus, and the casing thereof, are adapted to withstand substantial fluid pressures, e.g. in excess of 50 p.s.i., and the reject conduit is provided with a means to regulate the reject flow, which can regulate the cleanliness of the accepted stock. In such an embodiment in some cases it is advantageous that the minimum clearance between the rotary member and the screen member decrease with increased distance from the point of entry of the fluid being screened.

Various features of the invention will now be illustrated with reference to the accompanying drawings wherein.

Figure 1:
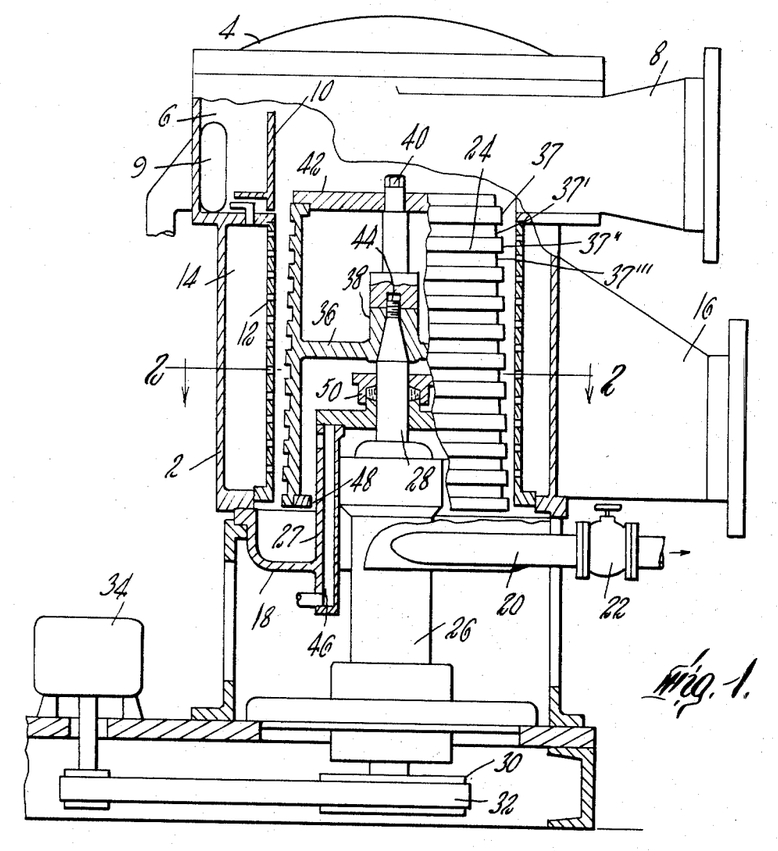
FIG. 1 is a side view, partially in vertical cross-section, of a preferred screening apparatus according to the present invention.
Figure 2:
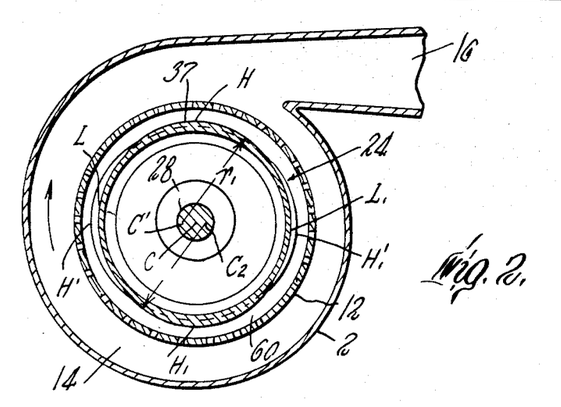
FIG. 2 is a horizontal cross-sectional view of the screening apparatus of FIG. 1, taken on line 2—2 thereof.
Figures 3, 4, 5:
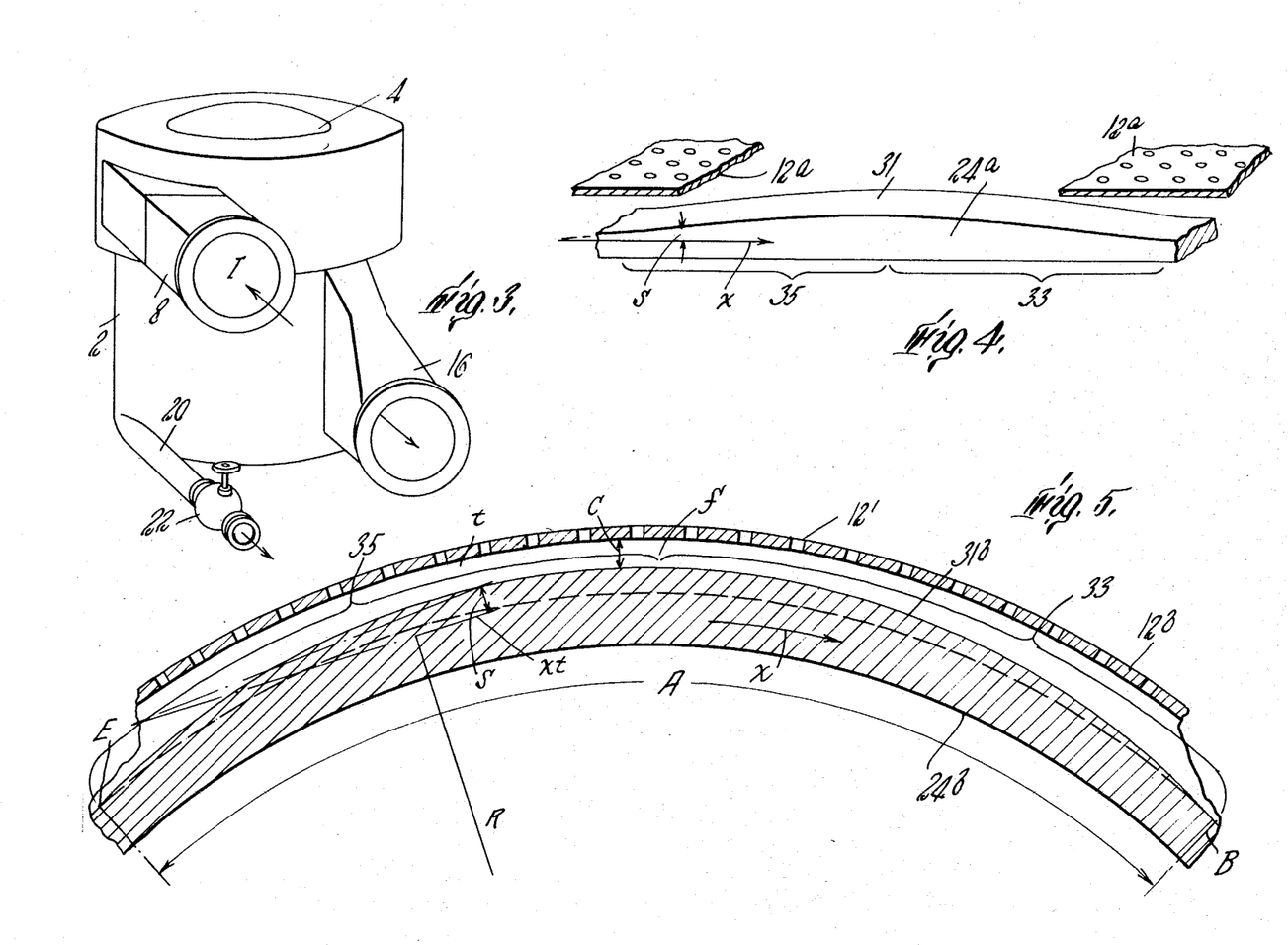
FIG. 3 is a perspective view of the exterior of the screening apparatus of FIG. 1.
FIG. 4 is a somewhat diagrammatic perspective view of a screen member and a cooperating rotary member.
FIG. 5 is a cross-sectional view of a screen member and cooperating rotary member both of the general form of a cylinder.

Referring now to the screening apparatus shown in FIGS. 1–3, the apparatus includes a vertically arranged pressure casing 2 including a removable pressure dome 4. An annular inlet gutter 6 is defined in the upper region of the casing 2 and an inlet conduit 8 is arranged to introduce pulp to be screened into the inlet gutter 6. A gutter trap 9 communicates with the inlet gutter 6 for removing heavy debris thrown to the periphery by centrifugal force.

The inlet gutter 6 communicates radially over a baffle 10 with the central part of the screening apparatus. Below the baffle 10 is located a circumferential, apertured screen member 12 whose walls are spaced inwardly relative to the casing 2, so as to define an annular accepts chamber 14 outside of the screen member 12. A tangential accepts conduit 16 adapted to remove fluid under substantial pressure is connected to the accepts chamber 14, having its initial portion extending the full height of the screen member 12.

Below the screen member 12 is arranged an annular rejects gutter 18 in communication with the inside of the cylindrical screen member 12. A rejects conduit 20 communicates with this rejects gutter 18, this conduit being capable of removing fluid under substantial pressure and being provided with a valve 22 which serves to regulate the flow therethrough. While this valve is shown regulatable by hand, it can also be automatically regulated e.g. to respond to changes in the inlet flow rate or changes in the pressure differential between inlet and accepts conduits or by changes in the reject consistency. Also, while the rejects conduit 20, shown tangnetial to the rejects gutter 18, extends in the direction opposite from the movement of inlet pulp, in some instances it may extend in the same direction, or be not tangential at all.

Referring to FIG. 2, it will be observed that the pressure casing 2 is slightly scroll-shaped in horizontal cross-section, and the screen member 12 is arranged therein so that the accepts chamber 14 increases in radial width gradually about its circumference, all the way along its extent until it discharges to the accepts conduit 16.

Referring to FIGS. 1 and 2, in this embodiment the rotary member of the invention comprises a drum 24 mounted inside and having an axis of rotation concentric with the cylindrical screen member 12. As shown, preferably the rotary drum 24 has a length equal to that of the screen member 12, a diameter substantially the same as the screen member, though with clearance, and is continuous circumferentially. Regarding the details of mounting in this preferred embodiment, the rotary drum 24 is mounted from the bottom end only upon a rotary shaft 28 which extends through a stationary bearing pedestal 26. For this purpose two vertically spaced-apart sets of ball bearings (not shown) are employed in the pedestal, one or both of which can take the axial thrust.

The lower end of the rotary shaft 28 extends below the bearing pedestal 26 and carries a pulley 30. This pulley is driven by a belt 32, or a series of belts, by an electric motor 34 capable of turning the drum 24 to develop a substantial surface speed when the casing is full of fluid.

Referring still to FIG. 1, preferably the drum member 24 has a central web 36, located substantially mid-way between its ends, at least near its center of gravity, joined to a hub 38 which is removably mounted upon rotary shaft 28 by means of a mounting nut 40 which may extend through the end cover 42 of the drum down to the threaded end 44 of the rotary shaft 28.

In this embodiment provision is made for introducing liquid to the reject gutter 18 for the purpose of maintaining the thick rejected material in a sufficiently fluid state to flow through the reject conduit 20. For this purpose it is advantageous to leave the lower end of the drum unsealed, and provide an upward flow passage 46 for the clear liquid into the drum 24, the fluid proceeding from passage 46 down through a slot 48 defined between the lower end of the rotary drum 24 and the stationary pedestal structure 27. A stuffing box 50 is employed on shaft 28 to prevent leakage.

The stationary screen member 12 may be of the usual form for fine screening, e.g. it can have 23 percent open area provided by circular holes of 1/16 inch diameter spaced in a staggered pattern on 1/8 inch centers.

The rotary member 24 in this embodiment is of tapered general form, increasing in diameter towards the reject gutter 18. Before describing the rotary member in detail, reference will now be made to FIGURES 5–7 to describe generally the gradually increasing and decreasing clearance aspect and the multi-layer aspect of the invention.

Referring to FIG. 4 a portion of screen member 12a is shown under which is shown a portion 24a of a rotary member which is mounted by means not shown to move in the direction indicated by the arrow X, to sweep past the screen plate. The rotary member 24a has a fluid contacting surface 31 directed toward the screen member 12a, but spaced therefrom, the space therebetween constituting a screening zone in which fluid to be screened resides.

According to the invention the fluid contacting surface of the rotary member is provided with at least one undulation in a form providing successive extended regions 33, 35 of gradually decreasing and gradually increasing clearance between the rotary member 24a and the screen member 12a, the slope being shown exaggerated for purposes of illustration from that presently preferred. At the minimum the clearance is sufficient, preferably on the order of about 1 inch in most cases, to enable relative movement between the rotary member 24a and fluid being screened, including separated particles at the screen surface.

Furthermore, according to the invention, the undulated surface, in the direction of movement X, is of very gentle slope relative to that direction, with a maximum slope, $s$ of less than 15°, and preferably less than 10°.

According to the invention the entire undulation is of extended form in the direction of movement to produce the proper effect upon the screen member. Furthermore, in the direction of action, e.g. the circumferential direction in the case of a rotor in the general form of a drum, an imaginary line projected along the surface would be unbroken, and would nowhere approach a radial alignment.

According to the invention, it is realized that such a rotary member as member 24a can have a desirable effect in a screening apparatus of maintaining a screened flow, and preventing the screen from being plugged by rejected material. In particular, the substantial duration of the decreasing clearance region is effective despite the relatively slight change in contour from point to point in the direction of movement.

Not only does the undulated surface provide a means for maintaining substantial flow, it also enables such flow to be obtained with a very low power requirement, by virtue of the streamlined form it presents. Such form acts to minimize cavitation, and makes the pressure surge gradual. Thus, the rotary member is capable of high speed operation as well as operation in a fully submerged state under substantial pressure.

Referring to FIG. 5 the screen member 12b is in the general form of a surface of revolution with the peripheral surface 31b of the rotary member gradually sloped relative to the direction of circular movement X to provide an elongated region 33 of gradually decreasing clearance relative to screen member 12b, followed by an elongated region 35 of gradually increasing clearance. It is to be observed that the maximum slope $s$ of the surface 31b in each region is less than 10°, preferably between about ½ and 6°. The minimum clearance $c$ is adapted to permit relative movement of fluid $f$, including rejected material, and the rotary member 24b, preferably this clearance being of the order of 1″, and within the range of ¼″ and 3″. Advantageously the rotary member has no protuberances or devices that lie closer to the screen member than the minimum clearance portions of the lobes, and preferably, in many instances, the rotary member has no protuberances whatsoever.

The overall length in the direction of movement from beginning, point B, to end, point E, of the undulation is preferably greater than 20° in arc length, A.

As indicated diagrammatically the fluid in the region 33 of decreasing clearance is displaced by the rotary member 24b and urged through the apertures 12′, by virtue of the wedging effect of the rotary member. However, because of the close clearance, even at the point of maximum clearance there is also a friction effect upon the fluid which acts at an angle substantially 90° to the radial. This effect tends to carry the fluid past the screen apertures, and the effect is offered as one explanation why a majority of the over-size fibers can be rejected, as is desired.

At the point of minimum clearance $c$ the liquid $f$ including rejected material at the screen member is subjected to the greatest radial pressure pulse at the same time that it receives its maximum friction driving force, so it appears that this friction driving tendency is of a compensating character.

In the region 35 of increasing clearance the fluid is subjected to a gradual decompression and also subjected to a rearward flow tendency, due to the increased spacing to the rear. This is however coupled with the forward driving force at the skin of the rotary member, resulting in mixing of the fluid and turbulence. In this region 35 the flow through the apertures is less than in region 33, which, along with the other effects, maintains a proper state at the apertures for increased flow when the next decreasing clearance region of the rotary member approaches.

Now it will be illustrated how the combination of other features with the general form just described can further condition the fluid to achieve a suitable state and assist in preventing undesirable large size particles from passing through the screen member.

Figure 6:
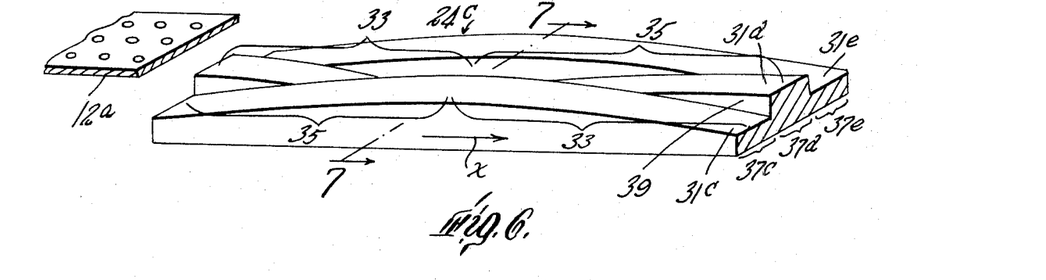
FIG. 6 is a view similar to FIG. 4 illustrating the multi-layer construction.
Figure 7:
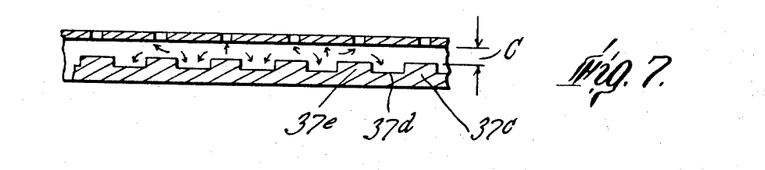
FIG. 7 is a cross-sectional view taken on line 7—7 of FIG. 6.

Referring to FIGS. 6 and 7 there are provided a multiplicity of adjacent bands 37c, 37d, 37e each aligned generally with the direction of travel X, and, as is preferable, each presents an undulating surface, 31c, 31d, 31e, preferably, for simplicity of manufacture, of identical profile. Adjacent bands are displaced relative to one another in the direction of movement X. Accordingly, in the direction perpendicular to the direction of movement X, and parallel to the screen member 12a, the surface of the wall member 24c has alternating ridges and depressions. For instance in the region of minimum clearance for band 37d, there is a region of maximum clearance for band 37c, and a side wall 39 of band 37d is directed toward the depression formed by the adjacent band 37c.

Referring to FIG. 7 it can be seen that, at any transverse cross-section, certain bands, e.g. bands 37c and 37e, in their decreasing clearance regions, displace fluid transversely into the spaces provided by the adjacent increasing clearance regions. In the cross-section of FIG. 7 decreasing clearance regions occur with the relatively raised bands, and vice versa; however rearwardly, beyond the point of minimum clearance, the reverse action occurs, with the relatively depressed (but decreasing clearance) regions displacing fluid and the relatively raised (but increasing clearance) regions providing additional fluid receiving space. Thus an inter-action of the adjacent bands occurs which mixes and gives turbulence to the fluid and lessens the pressing of the fluid towards the screen member, so that fewer of the undesirable large particles pass through the screen member. Accordingly the lobed concept of the present invention enables a transverse fluid displacing profile to be achieved in an improved manner.

Figure 7A:
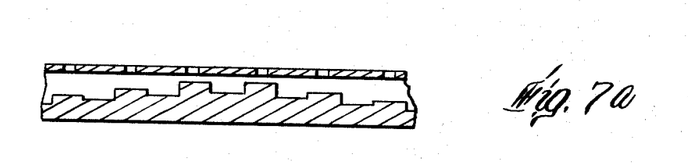
FIGS. 7a and 7b are views similar to FIG. 7 of alternative embodiments.

For various operating conditions the profile may be varied considerably. Referring to FIG. 7a, there is shown a stair-stepped profile that can be achieved by displacing successive pairs of 180°-out-of-phase bands such as 37c and 37d by selected increments in the direction of movement. This causes the various bands to produce their pressure pulses at different times to any given transverse line on said screen member, which is some instances may give better mixing of the fluid. Furthermore, upon rotation, though none of the bands are themselves tilted with respect to the direction of motion, a transverse feeding movement can be generated due to the generally sinusoidal cross-sectional form of the surface, and the progressive displacement of that cross-sectional shape proceeding in the direction of movement of the rotary member.

Figure 7B:
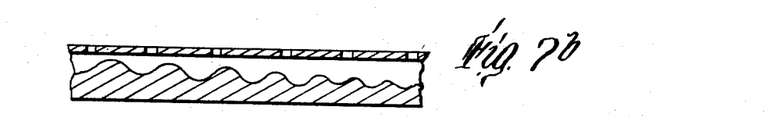

Referring to FIG. 7b, there is an illustration of bands that have arcuate profiles as well as decreasing width and height. These, like the other bands rise and fall in the direction of movement, producing extended regions of gradually decreasing and increasing clearance.

Referring back to FIGS. 1 and 2 the rotary member 24 mounted within screen member 12 has a multiplicity of adjacent bands 37, 37′, 37″, 37‴. etc., arranged on a single axis of rotation. Referring to FIG. 2 each band 37 defines a double lobed peripheral surface defined by substantially circular arcs, each extending between points H and $H_1$, the centers of each being offset from the axis of rotation C, and in this embodiment the centers lying on a common diameter. Adjacent bands are displaced 90° so that the high points, H and $H_1$ or point of minimum clearance for band 37 are displaced 90° from high points H′ and $H_1'$ for band 37′.

As a specific example each lobed band 37 can be formed by turning a cylindrical blank of original diameter H–$H_1$ about two equally off-set diametrically opposed centers $C_1$, $C_2$. For instance H–$H_1$ may be 16⅜ inch, L–L′ may be 15⅝ inch and $C_1$–$C_2$ may be ¾ inch. The axial dimension of each band (i.e. the band width) can be 1¼ inch, with adjacent lobed bands turned 90° to displace the respective sloped regions. This rotary member can be placed in a cylindrical screen of 18″ internal diameter, and rotated at speeds on the order of 1000 r.p.m.

In operation, rotation of shaft 28 causes the lobed surface to act upon the fluid in the manner described above, causing screened fluid to pass through the screen apertures and reject fluid and particles to remain in the screening zone 60 to progress from top to bottom, and be removed by rejects conduit 20.

Referring again to FIG. 1, it is seen that the screening zone 60 has a tapering form, decreasing in radial depth in the direction of the rejects gutter 18, due to the fact that the screen member 12 is cylindrical and the rotary member 24 is shown to be of overall tapered form.

Figure 8:
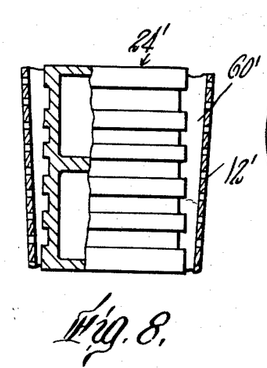
FIG. 8 is a side view, partially in cross-section, of an alternative construction of rotary drum and hollow screen members.

Referring to the alternative embodiment of FIG. 8 the screening zone 60′ tapers in the same direction, but due to the taper of the screen member 12′ rather than of the rotary drum 24′.

While in these embodiments the screening zone 60 tapers to smaller radial depth in the direction of the rejects outlet, it is possible in some instances for the taper to be provided in the opposite sense, to larger radial depth in the direction of the rejects outlet.

With regard to direction of rotation, it is found that different results can be obtained depending upon the relation of movement of the rotary member relative to the direction of spin of the fluid as it enters through inlet 8. Generally, movement in the same direction gives more efficient screening but lower capacity than movement in the opposite direction.

Figures 9, 10:
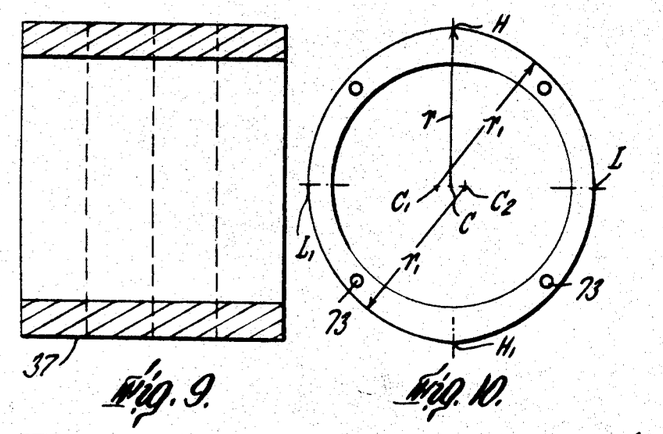
FIGS. 9 and 10 are cross-sectional and end views respectively of a rotary member.

Referring to FIGS. 9 and 10, for the purpose of manufacturing a non-tapered rotary member in accordance with the present invention, it is possible to begin with a metal cylinder blank of a length needed for the rotary member, and of a radius r. First the cylinder is turned, by means of end plates, to turn about axis $C_1$, displaced from axis C of the original cylinder, and the cylinder is turned on a radius $r_1$ that is sized to pass through the high points H and $H_1$ lying on a diameter of the original cylinder that is perpendicular to the line of centers $C_1C$. This turning operation produces low point L lying on the line of centers. Similarly, the blank is mounted on center $C_2$ that lies on line $C_1C$, spaced on the opposite side of blank center C from $C_1$, at an equal distance, and the blank is again turned to radius $r_1$, producing low point $L_1$. Thus there is produced a lobed member which, in this form, and advantageously in conjunction with other features, can be mounted within a screen member and rotated about axis C.

Advantageously, however, the cylinder is drilled at a plurality of predetermined points to provide locating holes 73, depending on the amount of displacement desired, and the cylinder is cut into a multiplicity of layers, $37_h$, $37_i$, $37_j$, $37_k$ along the dashed lines as shown.

Figures 11, 12, 14, 14A:
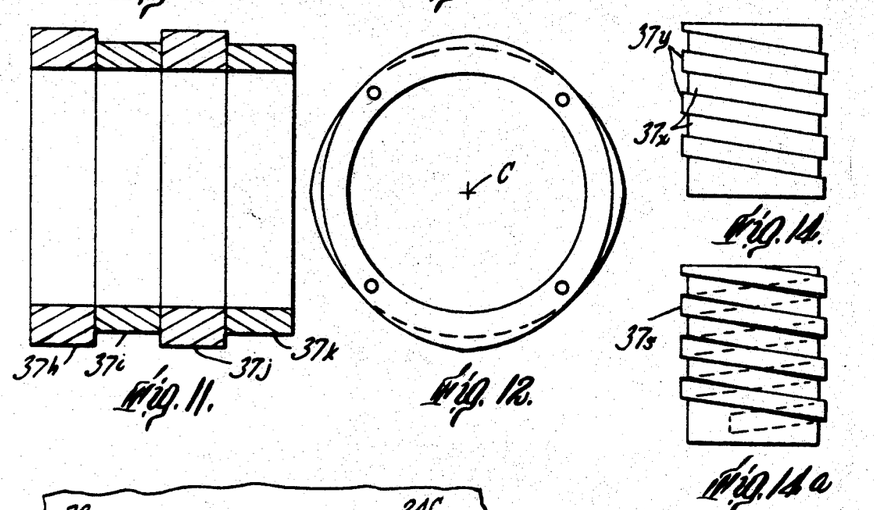
FIGS. 11 and 12 are views similar to FIGS. 9 and 10, respectively of the rotary member of those figures modified according to the multi-layer principle.
FIGS. 13 and 14 are side views of alternative constructions of the multi-layered rotary member.

Thereupon, referring to FIGS. 11 and 12 adjacent layers are arcuately displaced about center C, locating rods are passed through the locating holes of adjacent layers, and the thus formed multi-layered lobed rotor is permanently joined e.g. by welding or employing the locating rods as tie rods. Alternatively the shape of the rotor of FIGS. 11 and 12 can be achieved by machining a metal cylinder blank in alternate layers to make an integral multi-lobed rotor.

Figure 12A:
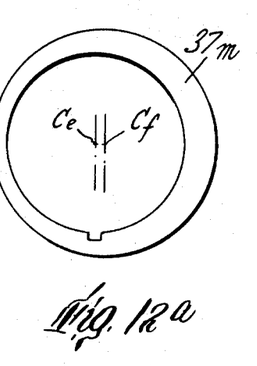
FIGS. 12a and 12b are plan and vertical cross-sectional views, respectively, of a preferred construction of the multi-layered rotary member.
Figure 12B:
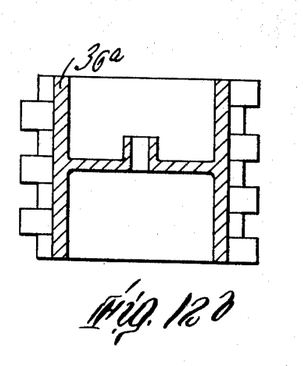

Referring to FIGS. 12a and 12b as another preferred embodiment a number of circular discs 37m may be formed, all drilled with a common eccentric axis $C_e$ relative to the axis $C_f$ of formation, and mounted on a keyed rotor body, with every pair of adjacent discs having obverse and reverse sides in contact.

Figure 13:
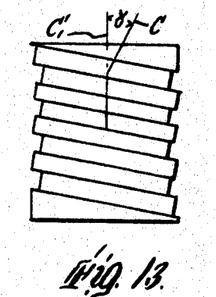

Referring to FIG. 13, as an alternative embodiment, after the layer members are formed, they may be mounted in a cocked relation on axis $C_1'$ lying at angle α to axis C, in addition to being arcuately displaced whereby they may produce axial pulses, if desired, in addition to the lobed action.

As an alternative to FIG. 13, referring to FIG. 14, a cylinder blank can be sliced as a first step, 2 groups of like-oriented slices 37x, 37y can be machined about different eccentric axes parallel to the cocked axis, and then the slices can be finally assembled in alternating form as shown.

Referring to FIG. 14a still another means of forming a rotary member in accordance with the invention is by means of a thread cutting machine having a radially movable tool that permits a lobed configuration to be obtained. Accordingly continuous band 37s has an undulating form which encircles the axis repeatedly in a helical manner, with adjacent portions out of phase to produce transversely adjacent highs and lows. The direction of extension of the band is thus inclined to the axis of the rotary member, as in the case of the embodiments of FIGS. 13 and 14, but in a different manner.

Figure 15:
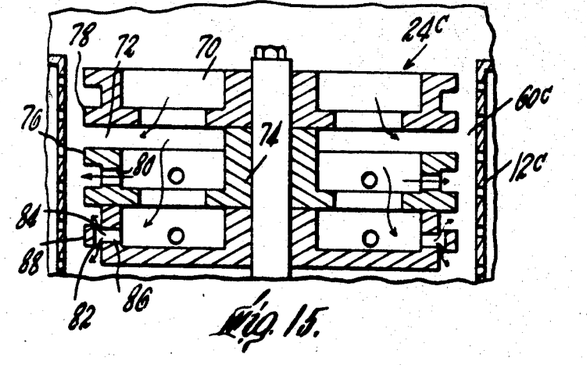
FIG. 15 is a cross-sectional view of another embodiment of the rotary member adapted to introduce fluid to the screening zone.

Referring to FIG. 15 there is shown, for illustrative purposes, three means for introducing fluid from the rotary member 24c to the screen zone 60c. The rotary member is provided with passages 70 connecting to a supply of fluid, which may be clear water or fluid to be screened, depending upon the particular screening action to be accomplished.

The first outlet 72 is formed by taking advantage of the ability to space adjacent layer members apart, the hub 74 of one of the layer members extending axially beyond its lobed periphery 76 whereby the adjacent lobed layer 78 is spaced axially away, providing a fluid passage therebetween. One advantage of this arrangement is that the outlet area can be very substantial, hence the flow velocity can be kept small.

The second outlet consists of holes 80 drilled in the periphery of a lobed layer. Each hole is located at a low point, or at least preferably in an area of clearance greater than the minimum for the layer, to prevent a scouring action, where, as is preferred, the rotary member is driven at high speeds.

The third provision takes particular advantage of the multi-layered lobe construction. The side walls 82 of a high or small clearance region of a lobed layer is drilled, providing outlets 84 which, instead of being directed toward the screen member, are directed parallel to it, or indeed, with suitable under cutting of the sidewall could even be directed at an angle away from the screen member. The outlet 84 is supplied by a radial passage 86, and fluid passing from supply passage 70 is first directed radially, then, before discharging through outlets 84, it is diverted by surface 88, so that radial movement is stopped, hence the accelerating effect of the rotary member upon the flow is considerably reduced making it possible to introduce the fluid at extremely high speeds of the rotary member without undue scouring of the screen member.

Figure 15A:
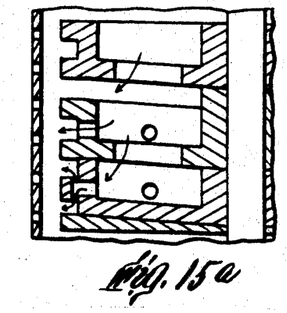
FIG. 15a is a view similar to FIG. 15 of a modified construction.

The illustration of FIG. 15a is similar to FIG. 15, except the layers are cocked, which makes it possible, with suitably spaced outlet holes to subject all parts of the screen member to the same action of the fluid.

Figure 16:
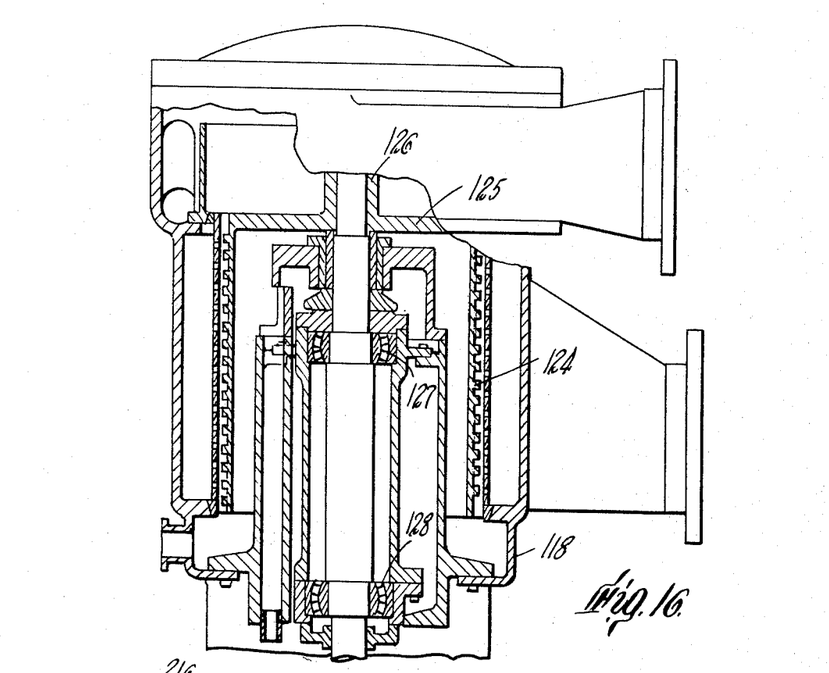
FIG. 16 is a vertical cross-sectional view of an alternative form of screening apparatus according to the invention.

Referring to FIG. 16 there is shown an alternative embodiment which is more compact and in some instances offers a better utilization of materials as well as operational advantages.

Unlike FIG. 1, in this embodiment the rotor 124 has an integral top 125 which incorporates a hub 126, which is fastened to the central shaft. Also the upper bearing 127 lies above the center height of the screen member, and the lower bearing 128 lies at substantially the same height as the rejects gutter 118. Thus a cantilevered construction is obtained without the requirement of as much over-all height as was required for the embodiment of FIG. 1.

Figure 17:
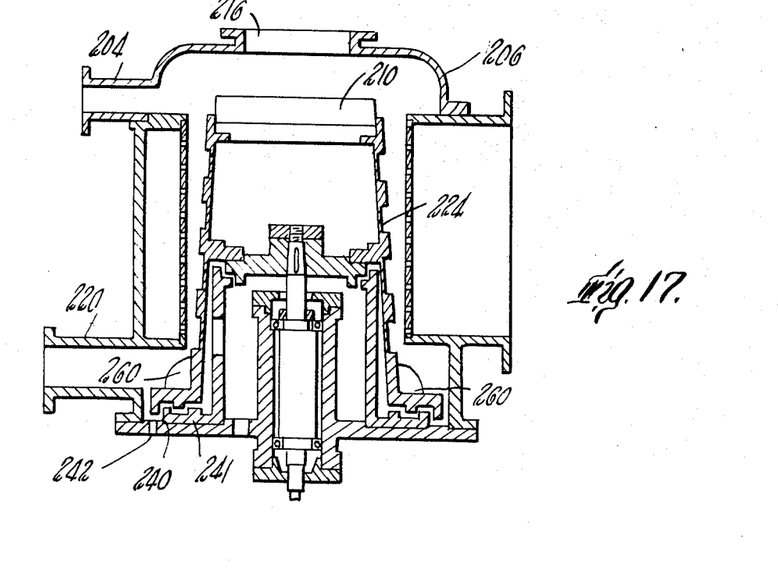
FIG. 17 is a vertical cross-sectional view of another alternative form of the screening apparatus.

Referring now to the embodiment of FIG. 17, the general construction of this preferred screening apparatus is similar to that of FIG. 1 except for the features to be described.

The inlet conduit 216 is axially aligned with the rotary drum 224, and discharges against the free end thereof. A plurality of vanes 210 are provided on that end of the rotary drum, and due to its high speed the drum flings the inlet stock outwardly to the guttertrap 206, and also insuring even distribution of the pulp to the screening zone. Any heavy weight objectionable material can be intermittently removed through tangential outlet 204.

At the opposite end of the rotary drum 224, the lower part of the drum is preferably formed into a labyrinth seal 240 in cooperation with a stationary end casing member 241, into which is introduced clear water or other liquid at 242 accomplishing two purposes. One, the liquid keeps the spacing between the rotary member and the end member free of the thick rejected pulp, so that the drum can rotate freely, and secondly, it dilutes to some degree the rejected pulp to enable it to flow freely.

Vanes 260 are also provided at the lower end of the drum member for propelling the high consistency rejects through the rejects conduit 220.

This embodiment, just as the embodiment of FIGS. 1 and 16, is very well adapted for horizontal arrangement as well as vertical.

Figure 18:
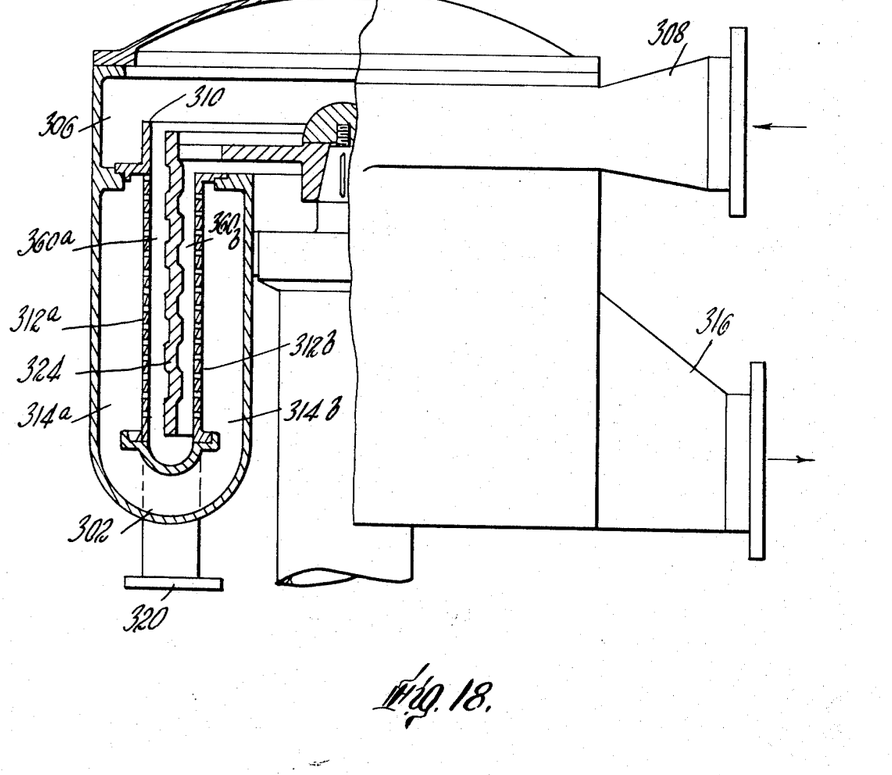
FIG. 18 is a side view, partially in vertical cross-section, of an alternative form of screening apparatus employing concentric inner and outer screen members between which is mounted a rotary member according to the invention.

Referring to the embodiment of FIG. 18, two concentric, radially spaced-apart, cylindrical screen members 312a and 312b are provided between which moves a driven rotary wall member 324 having a multi-layered, lobe periphery on both inside and outside, to act upon the pulp in screening zones 360a and 360b. Flow through the inlet conduit 308 enters gutter 306, flows over baffle 310, into the screening zones 360a and 360b. Accepted stock passes through the screen members 312a and 312b to accepts compartments 314a and 314b, defined by casing 302 surrounding the screen assembly, thence out through accepts conduit 316. Rejects flow from the screening zones through rejects conduits 320.

Among the advantages of the multi-layered lobe construction of the invention as illustrated by the foregoing embodiments is the achievement of particularly desired combinations of screening efficiency and capacity as well as avoidance of severe pressure pulsations in the accepts line and avoidance of fatigue wear conditions for the screen member.

While all of the wall members shown have had substantially the same working area as the screen members with which they are used (i.e. they have substantially the same axial and circumferential dimension), and the lobes have been uniformly distributed thereover, as is presently highly preferred, it must be understood that certain benefits of the invention are achievable when these conditions do not exist. For instance the distribution on the rotary member may be irregular, even with substantial areas not covered, and/or the rotary member itself may be discontinuous or have one or both dimensions substantially different from the dimensions of the screen member.

In conclusion, it must be observed that the present invention marks a substantial advance in the screening of pulps and in light of the teachings above, numerous modifications of the various details can be made within the spirit and scope of the invention.

What is claimed is:

1. In a screening apparatus for separating the fibers of a fluid mixture of fibrous material and liquid, into an accepts portion and a rejects portion, the apparatus comprising a substantially cylindrical apertured screen member and a rotary member mounted substantially coaxial therewith, said rotary member providing a fluid-contacting surface directed toward said screen member and defining therewith a screening zone through which fluid can proceed while exposed to the screen member, means for supplying fluid to said screening zone, an accepts passage for receiving the portion of fluid which passes through said screen member, and means for removing rejected matter from said screening zone, the improvement wherein at least for a substantial portion of the axial length of said fluid-contacting surface said surface, in the general direction of movement of the rotary member, is substantially entirely sloped relative to said screen member in an undulating manner to provide in succession a region of gradually increasing and a region of gradually decreasing clearance relative to said screen member, said surface including at least first and second transversely adjacent sloped band portions extending in the general direction of movement substantially fully about the axis of rotation, said band portions disposed relative to one another so that a region of decreasing clearance for one band is axially aligned with a region of increasing clearance for the transversely adjacent band whereby the regions of lesser clearance of said rotary member can, during rotation, displace said fluid laterally and parallel to said screen member into regions of greater clearance to condition said fluid and maintain flow of said accepts portion through said screen member.

2. The screening apparatus of claim 1 wherein said fluid contacting surface is defined by a substantial number of transversely adjacent sloped band portions each encircling the axis of said rotary member, the width of each band portion in the axial direction being substantially less than the axial length of said rotary member.

3. The screening apparatus of claim 2 wherein said fluid contacting surface includes substantially annularly arranged side wall transition surfaces extending between transversely adjacent bands.

4. In a screening apparatus for separating the fibers of a fluid mixture of fibrous material and liquid into an accepts portion and a rejects portion, the apparatus comprising an apertured screen member in the form of a surface of revolution, a rotary member mounted substantially coaxial therewith, said rotary member providing a fluid-contacting surface directed toward said screen member and defining therewith a screening zone through which fluid can proceed while exposed to the screen member, means for supplying fluid to said screening zone, an accepts passage for receiving the potrion of fluid which passes through said screen member, and means for removing rejected matter from said screening zone, the improvement wherein at least for a substantial portion of the axial length of said fluid-contacting surface said surface, in the general direction of movement of the rotary member, is substantially entirely sloped relative to said screen member in an undulating manner to provide in succession a region of gradually increasing and a region of gradually decreasing clearance relative to said screen member, said surface including at least first and second transversely adjacent sloped band portions extending in the general direction of movement, said band portions disposed relative to one another so that a region of decreasing clearance for one band is axially aligned with a region of increasing clearance for the transversely adjacent band, the direction of extension of each of said bands being inclined to the axis of said rotary member and each extending at least a full turn about the axis of rotation whereby the regions of lesser clearance of said rotary member can, during rotation, displace said fluid laterally and parallel to said screen member into regions of greater clearance to condition said fluid and maintain flow of said accepts portion through said screen member.

5. The screening apparatus of claim 4 wherein said bands are formed by the peripheries of disc-form members mounted in a tilted condition relative to the axis of said rotary member.

6. The screening apparatus of claim 4 wherein said bands encircle the axis of said rotary member helically, with first and second adjacent helical turns out of phase whereby at one location a region of decreasing clearance for said first band transversely corresponds with a region of increasing clearance for said second band.

7. In a screening apparatus for a fluid mixture of fibrous material and liquid, for separating the fibers into an accepts portion and a rejects portion, the apparatus comprising a substantially cylindrical apertured screen member and a rotary pulsing member in the general form of a drum located within said screen member and having its rotary axis generally coaxial therewith, defining therewith a screening zone through which fluid can proceed while exposed to said screen member, means for supplying fluid to said screening zone, an accepts passage for receiving the accepts portion of liquid and fibers which passes through said screen member, and means for removing the rejects portion of liquid and fibers from said screening zone, the rotary member constructed and arranged with clearance from said screen member to enable relative movement therebetween and shaped to displace said fluid mixture locally in directions parallel to said screen member as well as perpendicular thereto, the improvement wherein the peripheral fluid contacting surface of said rotary member which moves in a generally circular path adjacent the inner surface of said screen member is defined by a plurality of generally circumferential band portions spaced axially along said rotary member, the surface of each band portion defining, in the general direction of movement of the rotary member, regions of increasing and then decreasing clearance relative to said screen member, the regions of minimum clearance of any given band portion being axially aligned with regions of greater clearance of the next axially adjacent band portion whereby the regions of lesser clearance of said rotary member can, during rotation, displace said fluid laterally and parallel to said screen member into regions of greater clearance to condition said fluid and maintain flow of said accepts portion through said screen member.

8. The screening member of claim 7 wherein said generally circumferential bands are formed by a multiplicity of disc members mounted together face to face in layers to define said rotary pulsing member.

9. The screening member of claim 7 wherein each band portion defines an extended region of gradually increasing clearance relative to said screen member and, in succession therewith, an extended region of gradually decreasing clearance relative to said screen member, the maximum slope relative to said direction of movemnet of said fluid-contacting surface at both said increasing and decreasing clearance regions being less than 15°.

10. The screening apparatus of claim 7 wherein said fluid contacting surface is uninterrupted throughout said circular path, without portions inclined in a perpendicular relation to said direction of movement.

11. The screening apparatus of claim 7 wherein said fluid contacting surface of each band portion undulates continuously throughout said circular path, providing successive regions of increasing and decreasing clearance.

12. The screening apparatus of claim 11 wherein said undulating surface is substantially smooth in the direction of movement and free of other protuberances.

13. The screening apparatus of claim 7 wherein said increasing and decreasing clearance portions of said fluid contacting surfaces are sloped at angles in the range of between ½ and 6° relative to the direction of circular movement.

14. The screening apparatus of claim 13 wherein the arc distance along each band portion from each point of minimum and maximum clearance to the adjacent point of minimum and maximum clearance, respectively, is greater than about 20°.

15. The screening apparatus of claim 14 wherein the distance along each band portion between successive points of minimum clearance is on the order of at least one foot.

16. The screening apparatus of claim 7 wherein said band portions have generally radial side walls defining abrupt discontinuities.

17. The screening apparatus of claim 16 wherein a fluid supply passage is provided through said rotary member, a plurality of outlets arranged to discharge fluid from said passage into said screening zone, said outlets directed generally parallel to the surface of said screen member and located on said side walls.

18. The screening apparatus of claim 7 adapted for pressurized operation, said means for supplying fluid to said screening zone comprising a conduit adapted to introduce fluid under substantial pressure, said accepts passage defined by a pressure casing surrounding and spaced from said screen member to provide an accepts chamber and an accepts conduit adapted to remove fluid under substantial pressure connected thereto, said means for removing rejected matter from said screening zone comprising a reject conduit adapted to remove fluid under substantial pressure and means associated with said reject conduit adapted to regulate the flow therethrough, said rotary member substantially throughout the extent of said screen member provided with fluid-contacting surfaces that are smooth but continuously undulating in the direction of movement of said rotary member, adapted to cause screening of said fluid without substantial pressure drop in said fluid.

19. The screening apparatus of claim 7 wherein the minimum clearance between said band portions and said screen member is on the order of between about ¼ and 3 inches.

20. The screening apparatus of claim 7 wherein adjacent band portions are substantially identical, said band portions rotatively displaced about said rotary axis so that the regions of increasing and decreasing clearance of adjacent band portions are transversely displaced.

21. The screening apparatus of claim 20 wherein points of minimum clearance for one band portion are substantially transversely aligned with points of maximum clearance with the next adjacent band portion.

References Cited

UNITED STATES PATENTS

| | | | |
|---|---|---|---|
| 319,574 | 6/1885 | Gathmann | 209—306 |
| 501,214 | 7/1893 | Reinicke | 209—273 |
| 772,373 | 10/1904 | Qviller | 209—306 |
| 1,163,275 | 12/1915 | Spangenberg | 209—270 |
| 1,921,750 | 8/1933 | Heinrich | 209—300 |
| 2,037,081 | 4/1936 | Manning | 209—300 |
| 2,975,899 | 3/1961 | Cannon | 209—273 |
| 3,093,579 | 6/1963 | Schmidt | 210—415 |
| 3,243,041 | 3/1966 | Cowan | 209—300 |

FOREIGN PATENTS

| | | |
|---|---|---|
| 20,847 | 11/1909 | Norway. |
| 241,860 | 10/1910 | Germany. |

HARRY B. THORNTON, *Primary Examiner.*

R. HALPER, *Assistant Examiner.*